H. F. REINHOLD & A. F. MEYER.
CHEESE PRESS.
APPLICATION FILED APR. 3, 1916.
1,221,219.
Patented Apr. 3, 1917.
2 SHEETS—SHEET 2.
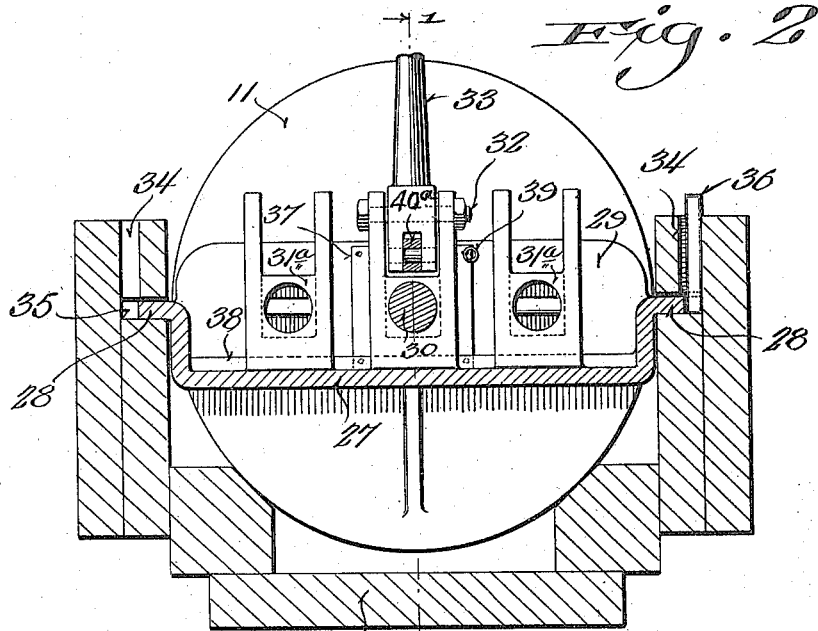
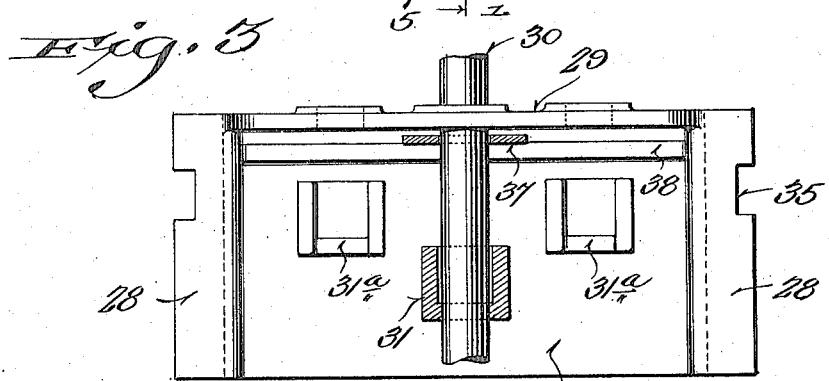
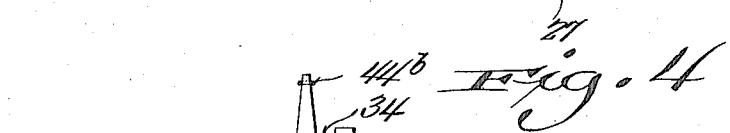
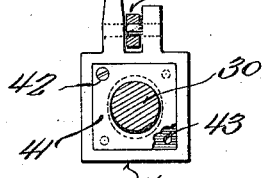

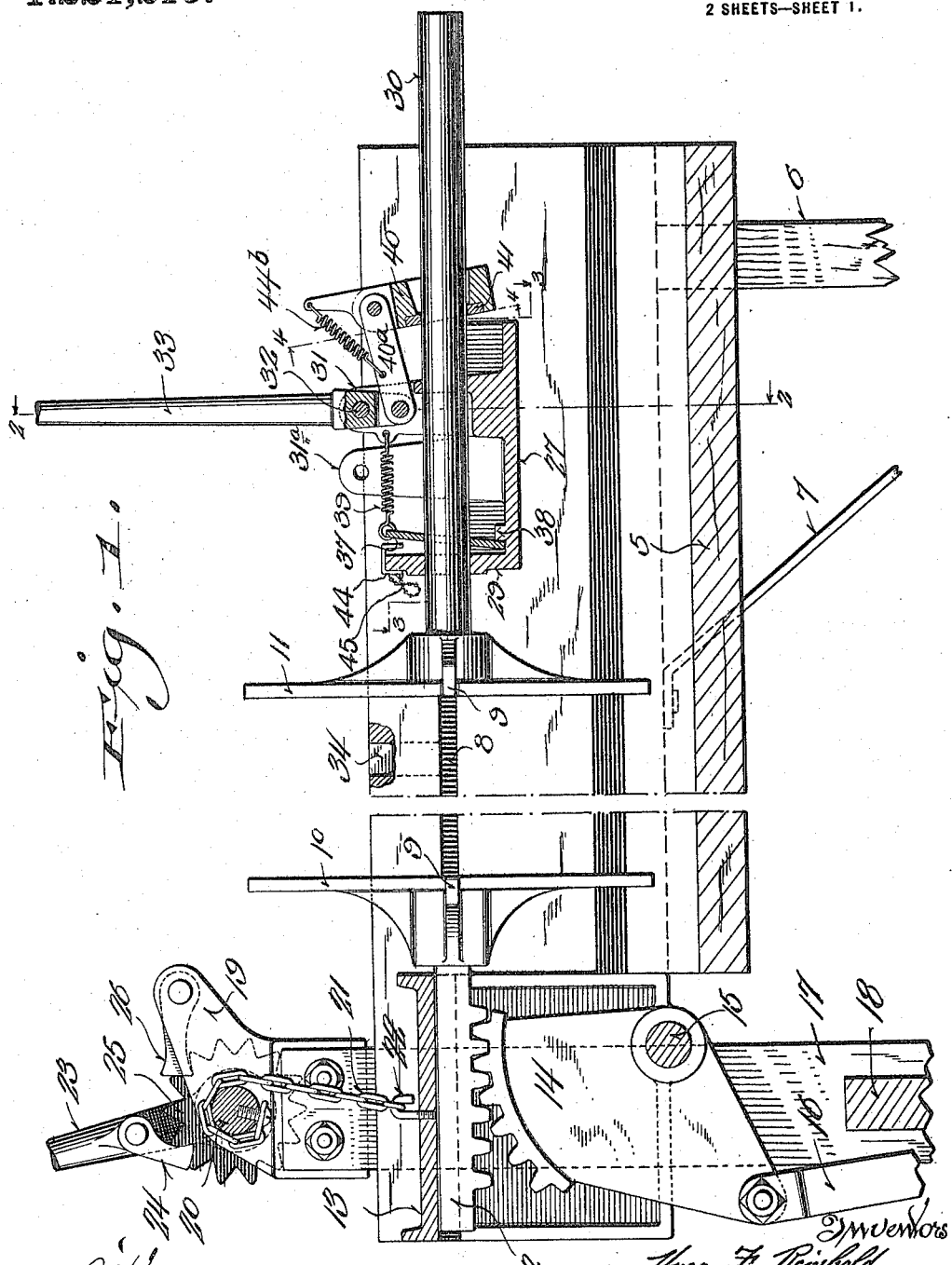

UNITED STATES PATENT OFFICE.

HUGO F. REINHOLD AND ALFRED F. MEYER, OF PLYMOUTH, WISCONSIN.

CHEESE-PRESS.

1,221,219.

Specification of Letters Patent.

Patented Apr. 3, 1917.

Application filed April 3, 1916. Serial No. 88,429.

*To all whom it may concern:*

Be it known that we, HUGO F. REINHOLD and ALFRED F. MEYER, both citizens of the United States, and residents of Plymouth, in the county of Sheboygan and State of Wisconsin, have invented certain new and useful Improvements in Cheese-Presses; and we do hereby declare that the following is a full, clear, and exact description thereof.

The present invention relates to new and useful improvements in cheese presses, more particularly of the gravity actuated type shown in Patent No. 1,168,330 granted to Hugo F. Reinhold Jan. 18, 1916, of which the present structure is an improvement.

It is the object of the present invention to improve the structure and operation of the means for holding the trough of the cheese press from gravity movement, and of the means for moving the rear follower plate.

In connection with the rear follower plate, it is more specifically an object of the present invention to provide an adjusting and holding means therefor whereby an exact adjustment and securement of the plate may be procured in contradistinction to the ratchet and pawl mechanism heretofore employed and shown in the said previous patent.

In connection with the adjusting means for the rear follower plate, it is further an object of the invention to provide a means for procuring relatively great variations in the position of the plate operating in conjunction with lever operated means for procuring a relatively slight variation of the position of the follower plate whereby the follower plate may be very readily actuated to procure an initial pressing action on the cheese.

With the above and other objects and advantages in view, the invention resides more particularly in the novel combination, arrangement and formation of parts more particularly hereinafter described and particularly pointed out in the appended claims.

In the drawings:

Figure 1 is a vertical longitudinal sectional view through a cheese press constructed in accordance with the present invention.

Fig. 2 is a transverse sectional view through the trough of the press and through the rear follower plate carriage as indicated by the line 2—2 of Fig. 1.

Fig. 3 is a top plan view of the carriage with portions thereof in section to more clearly illustrate the structure.

Fig. 4 is a detail sectional view on the line 4—4 of Fig. 1 and showing the grip plate for advancing the follower plate shaft.

Referring now more particularly to the accompanying drawings, the general structure of the cheese press is as shown in the said previous patent, and includes the trough 5 supported at its rear end by the rigidly connected rear legs 6, braced by the bar 7 and provided in the inner face of each side with a longitudinal groove 8 in which is engaged lug flanges 9 at respective sides of the opposed forward and rear follower heads 10 and 11. The forward follower head 10 has secured thereto, a gear toothed shank bar 12 slidable in a groove formed in the bottom of a transverse housing plate 13 carried by forward extensions of the trough sides and the teeth of this shank mesh with a gear segment 14 pivotally mounted on a shaft 15 carried by the bottoms of the trough side extensions, the gear segment having pivoted thereto outwardly of the pivot shaft a fulcrum link 16 having suitable pivoted connection (not shown) with the lower portion of a head frame including standards 17 between which the forward end of the trough projects, and a transverse beam 18 connecting the standards.

The standards are extended above the trough and carry at their upper ends upstanding plates 19 which journally support the transverse lifting drum shaft 20. Secured to the drum shaft and adapted to be wound thereon is a chain 21 which is adapted to engage a hook member 22 carried by the trough plate 13. Journaled on one end of the shaft 20 is an upstanding lever 23 which carries a pivoted dog 24 adapted to coact with a ratchet wheel 25 secured on the adjacent portion of the drum shaft.

Thus upon rocking the lever 23, the trough will be lifted to thus retract the follower head 10 to facilitate the insertion and removal of cheeses with respect to the trough, the ratchet wheel being held in successive steps against retrograde movement by a pawl 26 carried by the plate 19.

Thus an exceedingly simple means has been provided for lifting the forward end of the trough, it being noted that the drum shaft connects and braces the upper ends of the standards 17 in the manner of the cross beam provided in the structure of the aforementioned patent, and it being further noted that the present structure may be manipulated much more readily than the structure of said patent.

For advancing the rear follower head to procure an initial bracing action, and to hold the follower head in such advanced position, a carriage 27 is provided which is held for longitudinal sliding movement in the trough by flange portions 28 at its sides which engage in respective trough side grooves 8 and this carriage is provided with an upstanding wall 29 at its forward end through which is slidably passed a shaft 30 projecting from the rear follower head 11. This shaft is also slidably passed through an upstanding boss 31 formed intermediately on the carriage, the upper end of this boss being bifurcated to form pivot ears which carry a shaft 32 pivotally mounting an operating lever 33 which is adapted to actuate certain friction grip means for advancing the follower head shaft, when the carriage is held against sliding movement in the trough.

For holding the carriage at different positions longitudinally in the trough, to provide for relatively great variations in the desired position of the rear follower head, the sides of the trough are provided at spaced intervals with vertical sockets 34 communicating with the inner portions of the grooves 8 and the holding flanges 28 of the carriage are provided in their free edge portions with recesses 35 whereby pegs 36 may be selectively dropped into the sockets 34 to engage in the recesses 35 and thus hold the carriage.

The follower head shaft 30 is held against retrograde movement with respect to the carriage by a grip plate 37 apertured to loosely receive the shaft, and confined at its lower edge between the front wall 29 of the carriage and a transverse rib 38 on the floor of the carriage inwardly of the adjacent wall, the grip plate being resiliently urged to operative position by a retractile spring 39 secured to its upper portion and to one of the furcations of the boss 31.

The friction grip means for advancing the follower shaft wherein an exact desired adjustment of the rear follower head may be procured, comprises a grip block 40 apertured to loosely receive the shaft thereon rearwardly of the carriage, and connected with the lower end of the operating lever 33, by a link 40ª pivoted to its upper bifurcated portion and pivoted to the lever. The forward portion of the block is at its aperture provided with a preferably square countersink in which is positioned a wear plate 41 apertured also to loosely receive the shaft and having the edges of its aperture extending inwardly of the block aperture whereby said edges form the grip means for the shaft. The wear plate is secured in the block by a screw 42 passing through one corner thereof, and selectively engaged in one of a plurality of apertures 43 in the corner portions of the plate receiving countersink whereby the plate may be shifted about in the countersink in such manner that various fresh edges may be placed in operative relation to the shaft 30 to thus provide for a maximum degree of wear of the plate, and it is observed that by turning the plate in the countersink eight fresh edges may be procured to engage the shaft. The bifurcated upper portion of the block 40 is extended above the link 40ª and is connected at its extremities to the forward portion of the link by a retractile spring 40ᵇ whereby the block is resiliently urged at all times to operative position. It is observed that by rocking the handle end of the lever 33 forwardly the block 40 will be shifted rearwardly on the shaft and a reverse movement of the lever will engage the block locking with the shaft to advance the shaft, the grip plate 37 releasing its hold in this movement and again gripping the shaft upon the forward movement being completed, the oscillating of the lever and the rear follower head may be advanced as desired to procure an initial bracing operation.

The bracing structure illustrates a trough and follower head adapted for engaging a single series of cheeses. In some instances it would be desired to operatively associate two series of small cheeses with the present structure, which would entail the provision of a pair of rear follower members, and to adapt the present structure for this operation, the carriage is provided at the sides of the boss 31 with a pair of bosses 31ª which are offset forwardly therefrom to provide for ready insertion of the pivot bolts 32 and a friction grip mechanism is adapted for association with each of these bosses 31ª. In the commercial application of the invention two sets of gripping mechanisms would be provided.

In contradistinction to the ratchet mechanism heretofore employed for advancing the rear follower plate and shown in the said previous patent, the present friction gripping means provides for an exact adjustment of the follower head.

When it is desired to move the follower head rearwardly in the trough, as for instance in providing for the insertion of a fresh batch of cheeses, the grip plate 37 may be locked in inoperative position to permit further retrograde movement of the shaft. This is accomplished by means of a U-shaped clip 44, which is adapted to embrace the upper edge of the carriage wall 29, and the plate, and which is normally held on the wall for convenient operation by a flexible connection 45.

We claim:

1. In a cheese press the combination of a support member, a follower, a shaft extending from the follower, a spring urged grip plate on the shaft and connected with the support member for normally holding the shaft against retrograde movement and a grip plate connected with the member and adapted to engage said shaft to advance it.

2. In a structure of the class described, the combination of a support member, a follower member, a shaft extending from the follower member, a grip block loosely mounted on the shaft, a lever pivoted to the support member, a link pivoted to the lever and to an intermediate portion of the grip block and a spring secured to an end portion of the grip block and to the link.

3. In a structure of the class described, the combination of a support member, a follower member, a shaft projecting from the follower member, a grip block apertured loosely to the shaft, a grip plate carried by the block and apertured to receive the shaft, with its edges disposed inwardly of the edges of the block aperture, and said plate being shiftable to operatively dispose various edge portions with respect to the shaft.

4. In a structure of the class described, the combination of a support member, a follower member, a shaft projecting from the follower member, a grip plate carried by the support member and resiliently urged to a position holding the shaft against retrograde movement, means for advancing the shaft and means for locking the said grip plate to the support member in inoperative position.

In testimony that we claim the foregoing we have hereunto set our hands at Plymouth, in the county of Sheboygan and State of Wisconsin, in the presence of two witnesses.

HUGO F. REINHOLD.
A. F. MEYER.

Witnesses:
H. A. PETERSEN,
A. H. BORGES.

Copies of this patent may be obtained for five cents each, by addressing the "Commissioner of Patents, Washington, D. C."